(12) United States Patent
Seybold et al.

(10) Patent No.: US 11,798,096 B2
(45) Date of Patent: *Oct. 24, 2023

(54) CUSTOM DATA

(71) Applicant: Guidewire Software, Inc., San Mateo, CA (US)

(72) Inventors: John Lorne Campbell Seybold, Aspen, CO (US); Eugene Lee, Albany, CA (US)

(73) Assignee: Guidewire Software, Inc., San Mateo, CA (US)

( * ) Notice: Subject to any disclaimer, the term of this patent is extended or adjusted under 35 U.S.C. 154(b) by 117 days.

This patent is subject to a terminal disclaimer.

(21) Appl. No.: 17/320,669

(22) Filed: May 14, 2021

(65) Prior Publication Data

US 2021/0374870 A1 Dec. 2, 2021

Related U.S. Application Data

(63) Continuation of application No. 16/373,509, filed on Apr. 2, 2019, now Pat. No. 11,037,250, which is a (Continued)

(51) Int. Cl.
*G06Q 40/00* (2023.01)
*G06Q 40/08* (2012.01)

(52) U.S. Cl.
CPC .................... *G06Q 40/08* (2013.01)

(58) Field of Classification Search
CPC .............. G06Q 40/08; G06Q 40/00
(Continued)

(56) References Cited

U.S. PATENT DOCUMENTS

2011/0004622 A1* 1/2011 Marson ............. G06Q 10/06
707/812
2013/0060858 A1* 3/2013 Freishtat ............ H04L 67/535
709/204

(Continued)

*Primary Examiner* — Hai Tran
(74) *Attorney, Agent, or Firm* — Van Pelt, Yi & James LLP

(57) ABSTRACT

A technique of obtaining update data from a database includes accessing configuration data associated with a particular entity in a plurality of entities. The configuration data includes a specification of how to extract a set of entity generated data records from a remote data store associated with the particular entity. The remote data store associated with the particular entity comprises common data elements shared by the plurality of entities and entity-specific data elements specified by the particular entity. It further includes determining whether values for a data field specified in the configuration data have been previously extracted from the remote data store. It further includes generating, according to the specification included in the configuration data, a query for values associated with the data field. Generating the query comprises determining a range indicator that indicates a time period of data values to be extracted. The range indicator is determined based at least in part on the determination of whether values for the data field have been previously extracted. It further includes, based at least in part on the generated query, extracting, from the remote data store, values for the data field corresponding to the determined range indicator. It further includes storing the extracted values to a data store of a central host component that provides services to the plurality of entities.

21 Claims, 9 Drawing Sheets

Related U.S. Application Data continuation of application No. 14/202,851, filed on Mar. 10, 2014, now Pat. No. 10,275,832.

(60) Provisional application No. 61/791,899, filed on Mar. 15, 2013, provisional application No. 61/792,100, filed on Mar. 15, 2013.

(58) Field of Classification Search
USPC ............................................................. 705/4
See application file for complete search history.

(56) References Cited

U.S. PATENT DOCUMENTS

| | | | | |
|---|---|---|---|---|
| 2013/0073515 | A1* | 3/2013 | Bhide | G06F 16/254 |
| | | | | 707/602 |
| 2013/0297353 | A1* | 11/2013 | Strange | G06Q 40/08 |
| | | | | 705/4 |
| 2014/0089212 | A1* | 3/2014 | Sbodio | G06Q 50/18 |
| | | | | 705/311 |

* cited by examiner

Client | Central Host

| Claim | Amount Paid | Activities |
|---|---|---|
| 1 | $100 | 10 |
| 2 | $200 | 20 |
| 3 | $300 | 30 |
|  |  |  |

| Claim | Amount Paid |
|---|---|
| 1 | $100 |
| 2 | $200 |
| 3 | $300 |
|  |  |

FIG. 7C

| Claim | Amount Paid | Activities |
|---|---|---|
| 1 | $100 | 10 |
| 2 | $200 | 20 |
| 3 | $300 | 30 |
| 4 | $400 | 40 |

| Claim | Amount Paid | Activities |
|---|---|---|
| 1 | $100 | 10 |
| 2 | $200 | 20 |
| 3 | $300 | 30 |
| 4 | $400 | 40 |

FIG. 7D

CUSTOM DATA

CROSS REFERENCE TO OTHER APPLICATIONS

This application is a continuation of U.S. patent application Ser. No. 16/373,509, entitled CUSTOM DATA filed Apr. 2, 2019 which is incorporated herein by reference for all purposes, which is a continuation of U.S. patent application Ser. No. 14/202,851, entitled CUSTOM DATA filed Mar. 10, 2014 which is incorporated herein by reference for all purposes, which claims priority to U.S. Provisional Patent Application No. 61/791,899 entitled CUSTOM DATA filed Mar. 15, 2013 which is incorporated herein by reference for all purposes, and claims priority to U.S. Provisional Patent Application No. 61/792,100 entitled DATA EXTRACTION filed Mar. 15, 2013 which is incorporated herein by reference for all purposes.

BACKGROUND OF THE INVENTION

It can be efficient to deliver services via the cloud. A service provider can build an application once and share it among multiple companies. Typically, however, the types of data presented and used by central services is consistent across all companies. This can be limiting to companies. Additionally, for companies who have installed applications that share similar, but not identical database structures, extracting information from the companies can be burdensome.

BRIEF DESCRIPTION OF THE DRAWINGS

Various embodiments of the invention are disclosed in the following detailed description and the accompanying drawings.

FIG. 7C is a diagram illustrating states of a client table and a central repository table.

FIG. 7D is a diagram illustrating states of a client table and a central repository table.

DETAILED DESCRIPTION

Figure 1:
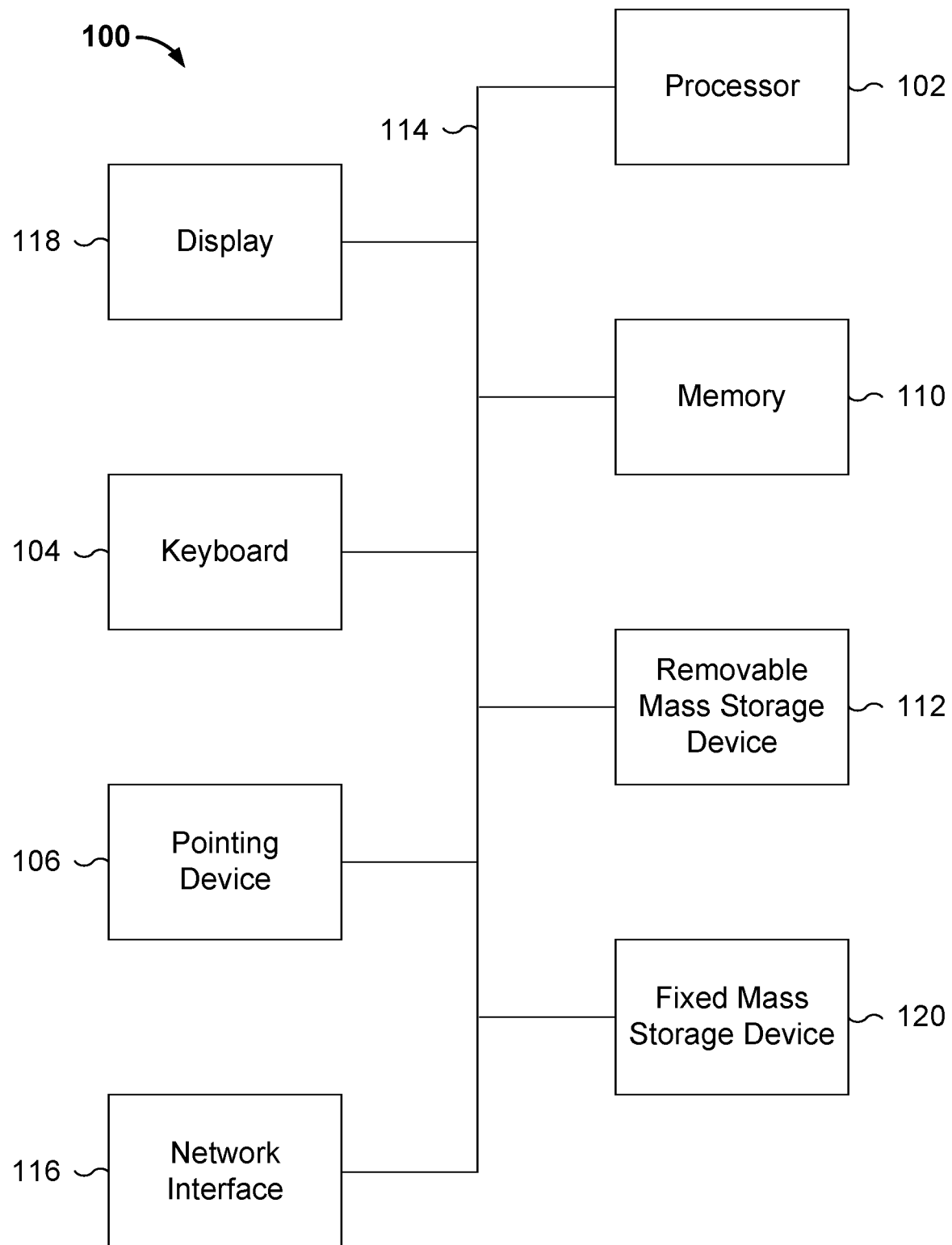
FIG. 1 is a functional diagram illustrating an embodiment of a programmed computer system for processing insurance data collected from a plurality of companies.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Processing insurance data collected from a plurality of companies is disclosed. In some embodiments, a service provider operating a central hosted component delivers applications and services that are subscribed to by multiple companies that operate respective installed core systems/application components that are associated with the service provider. As used herein, a company refers to a client, user, customer, or any other appropriate entity. The applications and services provided by the central host can augment or provide additional functionality to the clients, which may also have various applications installed locally as part of their core insurance systems. The central hosted component can be configured to retrieve data fields standard to the various clients for use with the applications/services provided by the central hosted component. Clients may also have their own custom data fields (also referred to herein as "elements") which they have created and stored and which they would like to use/integrate in the applications/services delivered by the central hosted component. In some embodiments, a client modifies a configuration file that is used to define various parameters associated with custom data fields, which specify, for example, how the central hosted component is to retrieve/extract custom data records (stored in client-generated data fields/elements not common to other client) from the client, the data type of the custom data records, and how the custom data records are to be used by applications/services provided by the central hosted component. Additionally, as the data on the client may change over time, updating of the data stored for a client on the central repository can be performed to maintain consistency and incorporate changes to client data. Additionally, clients (or the service provider) may specify data fields to be processed by the central hosted component that have not yet been previously captured by the central host, requiring a catch up of historical data from the client so that the central repository is up-to-date.

By using the custom data fields that are defined, retrieved, used, etc. on a per-client basis, clients can be presented centrally hosted applications/services that are tailored to, and behave (e.g., presentation of UI, functionality, etc.) according to, the client's particular custom configuration.

FIG. 1 is a functional diagram illustrating an embodiment of a programmed computer system for processing insurance data collected from a plurality of companies. As will be apparent, other computer system architectures and configurations can be used to process insurance data collected from a plurality of companies. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to process insurance data collected from a plurality of companies.

Processor 102 is coupled bi-directionally with memory 110, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100 and is coupled either bi-directionally (read/write) or uni-directionally (read only) to processor 102. For example, storage 112 can also include computer readable media such as magnetic tape, flash memory, PC-CARDS, portable mass storage devices, holographic storage devices, and other storage devices. A fixed mass storage 120 can also, for example, provide additional data storage capacity. The most common example of fixed mass storage 120 is a hard disk drive. Mass storage 112, 120 generally store additional programming instructions, data, and the like that typically are not in active use by the processor 102. It will be appreciated that the information retained within mass storage 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a non-transitory computer readable medium that includes program code for performing various computer-implemented operations. The computer readable medium is any data storage device that can store data which can thereafter be read by a computer system. Examples of non-transitory computer readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
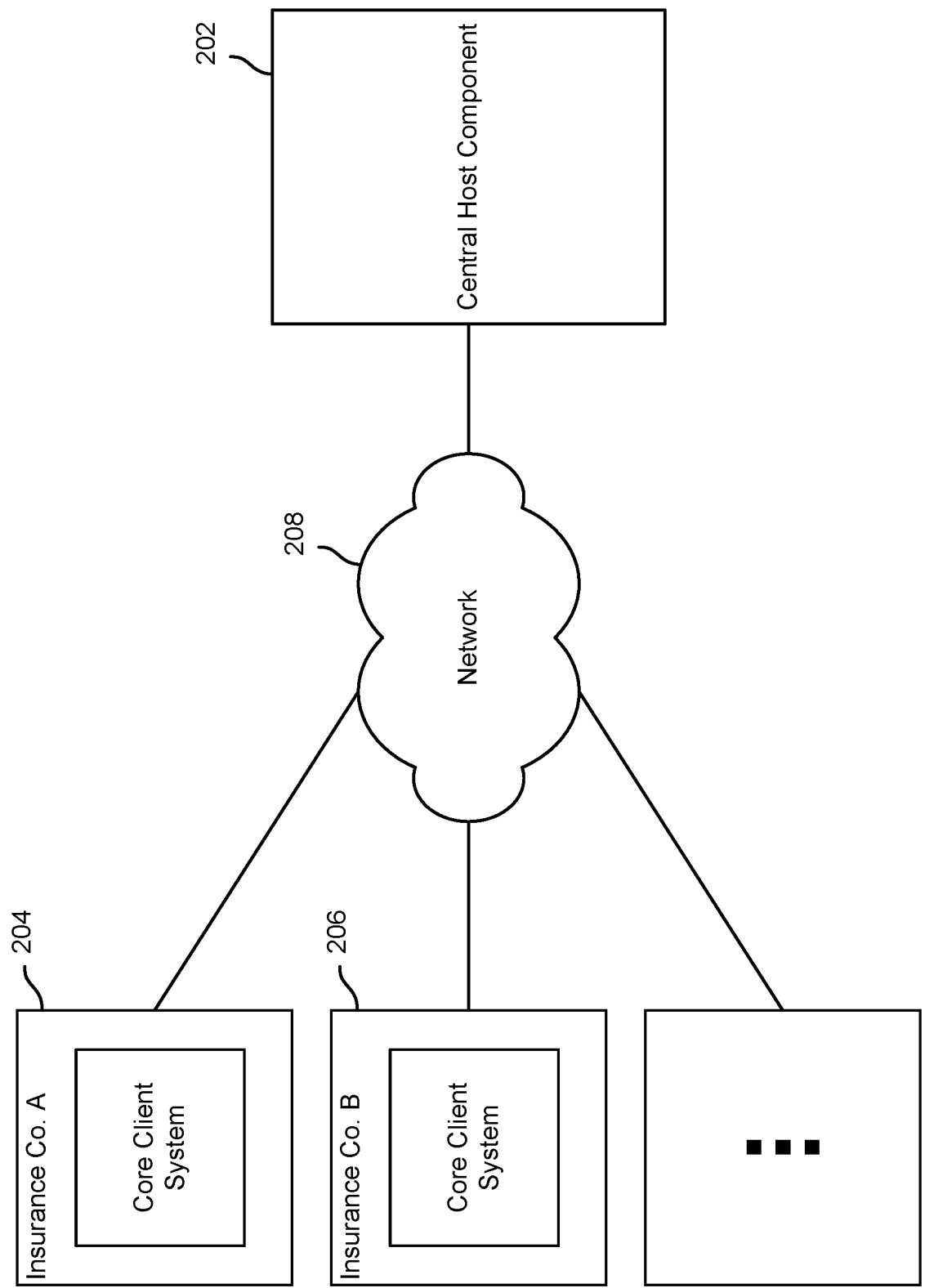
FIG. 2 is a block diagram illustrating an embodiment of a system for processing insurance data collected from a plurality of companies.

FIG. 2 is a block diagram illustrating an embodiment of a system for processing insurance data collected from a plurality of companies. In the example shown, a service provider such as Guidewire™ operates a central hosted component (202) such as Guidewire™ Live, which can include a central server or any other appropriate device that delivers applications and services (e.g., mapping services, weather services, comparison applications, etc.) that are shared among/subscribed to by various remote company client sites, such as company sites 204 and 206. Companies associated with the service provider include insurance companies/carriers (e.g., A and B). The central hosted component communicates with the various company sites via network 208. In various embodiments, network 208 includes one or more of a wired network, a wireless network, a local area network, a wide area network, the Internet, or any other appropriate network.

In addition to the applications and services provided by the central hosted component that are shared among the company sites, each company site has installed, for example, on servers local to the company site, a core client system or installed application component (associated with the service provider) that includes insurance related software applications for policy underwriting, claim management, billing, etc. Additionally, the clients can also have a local database storing data for the company. The applications/services provided by the central hosted component and shared among the company sites can be used to provide additional functionality to what is available to companies' core systems.

As will be described in more detail below, the central hosted component and company client sites can be configured such that the services provided by the central hosted component and shared among the various clients can use company generated data retrieved and aggregated from the various company sites. The data obtained from the companies can include both standard data records (e.g., standard/common insurance data that is collected from all companies) as well as custom data records (e.g., data that has been created by a particular company). The custom data can be used by a company to extend the functionality of centrally provided services of the central hosted component. For example, via a modifiable configuration file for a given company, the company can specify a custom data fields/elements of interest to be retrieved from the company, how company-generated data records stored in the custom data fields/elements (e.g., database columns) are to be retrieved from the company (and stored in a central repository on the central hosted component), how the custom data fields/elements are to be used by one or more centrally provided applications/services, etc.

Additionally, as will also be described in more detail below, the extracted data records (either standard/common or custom) can be duplicated and stored at a central repository on the central host. As the data on the client may change over time, updating of the data stored for a client on the central repository can be performed to maintain consistency and incorporate changes to client data. Additionally, clients (or the service provider) may specify data fields (also referred to herein as data "elements") to be processed by the central hosted component that have not yet been previously captured by the central host, requiring a catch up of historical data from the client.

Figure 3:
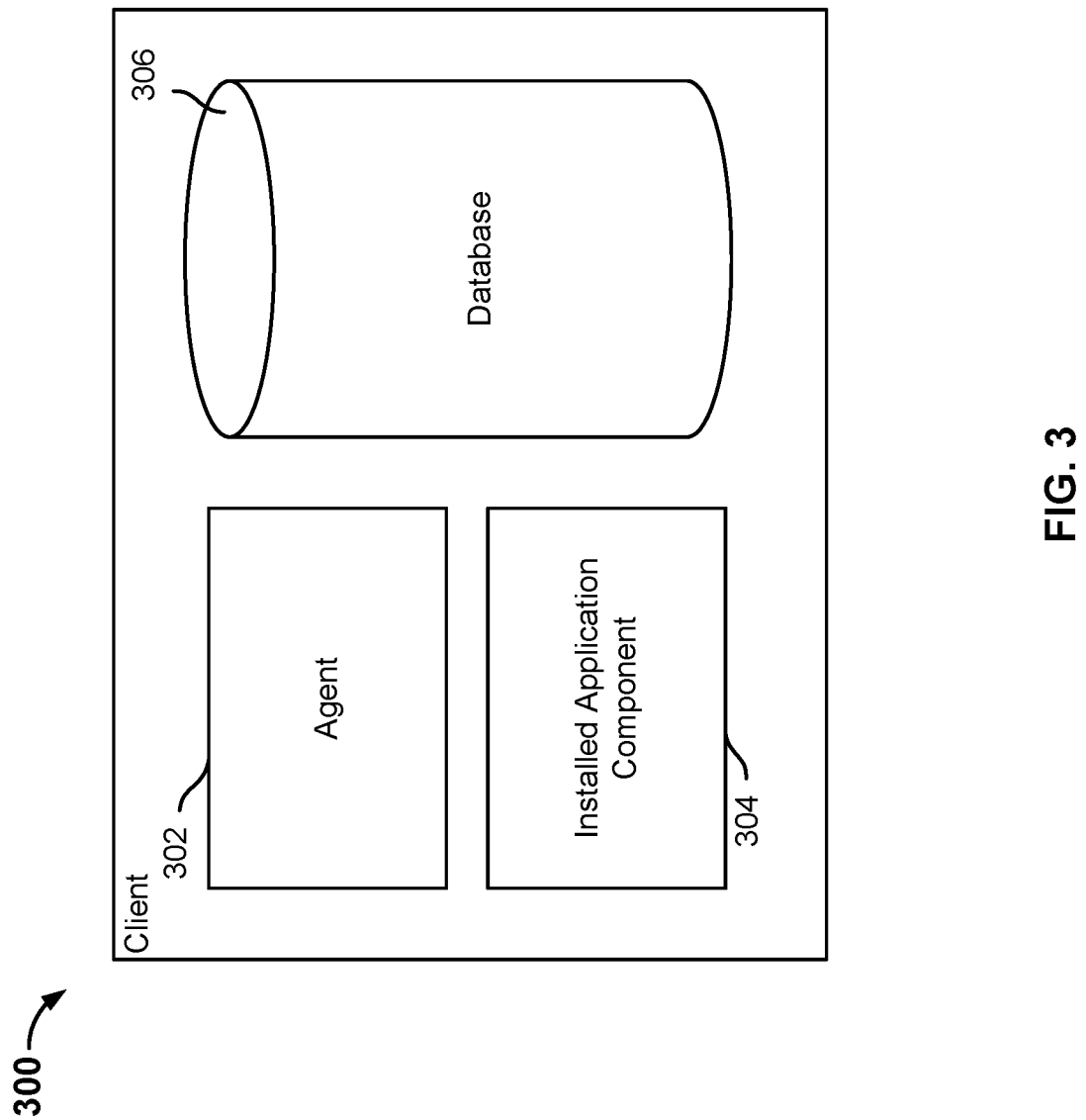
FIG. 3 is a block diagram illustrating an embodiment of a client system.

FIG. 3 is a block diagram illustrating an embodiment of a client system. In some embodiments, client system 300 is an example of installed application components/client systems installed at company sites 204 and 206 of FIG. 2. In the example shown, client system 300 includes agent 302, installed application component 304, and database 306.

In some embodiments, agent 302 is an application configured to facilitate communications with a central hosted component such as central hosted component 202 of FIG. 2. For example, the agent can be configured to coordinate data extraction/retrieval from the client to a central hosted component. The agent can initiate the data extraction process by calling the central hosted component and requesting query instructions specifying the fields to be retrieved (and in some cases, how the fields are to be retrieved) by the client to be sent to the central hosted component. In some embodiments, the communication initiation is performed periodically (e.g., based on a timer) as part of a batch process. In some embodiments, the contact is initiated on-demand. For example, upon reaching a particular point of an insurance processing workflow, the remote client may determine that it requires a centrally provided service to which the client is subscribed to process client information in order to return a result relevant to the workflow. For example, while processing a claim that reports a weather-related cause of damage, the client may wish for a centrally provided weather application to analyze the claim (e.g., the geographical location of the damage) to determine whether weather information supports the indicated cause. In order to do so, the client can dynamically and in an on-demand manner initiate data extraction and processing. In response to the initiation, the central host can use the configuration of the company to determine the applications/services to which the company is subscribed (e.g., weather, mapping, etc.) and send appropriate query instructions to the remote client for retrieving data. Upon retrieving the instructions, the client-side agent executes the query instructions and searches the local client database to request/identify the fields of interest, retrieves values for the fields of interests (e.g., retrieves rows of values from various columns in database tables), formats the fields/values into a form appropriate to be processed by the central hosted components, and transmits them to the central hosted component. In some embodiments, data extraction is performed incrementally, which will be discussed in further detail below.

In some embodiments, formatting the fields/data includes transforming the data into a standard form for processing by the centrally provided applications/services to which the client subscribes. For example, mapping may need to be performed, as the same type of field may be named differently by different client companies (e.g., personal auto coverage is named "X" on carrier A, but named "Y" on carrier B). The differently named fields can be mapped to the same personal auto coverage field on the central hosted component.

In some embodiments, installed application component 304 is configured to provide insurance related applications installed locally at the client. The insurance related software applications include applications for policy underwriting, claim management, billing, etc.

In some embodiments, database 306 is configured to store client side insurance data. Example data stored in the database includes insurance related data, such as data associated with insurance entities (e.g., insurance claims, policies, accounts, etc.). In some embodiments, the insurance related data includes both standard data and custom data. The standard data can include standard insurance data (e.g., payment amount, coverage code, etc.) that is common across all carriers or otherwise known to the central hosted component. Custom data can include non-standard data fields/elements (e.g., columns in a database) that are created by a carrier and are particular to the company or group of companies. For example, custom data can be specified for a sub-group of companies who are in the same industry or are of the same nationality and have specialized custom fields they would like to track for their group. In some embodiments, the insurance related data is stored in a table database structure, with each column representing a type of data field. Other configurations are possible. Additionally, the database configuration of the client database can be modified, and companies can define their own respective tables and fields, resulting in different database configurations for different clients.

Figure 4:
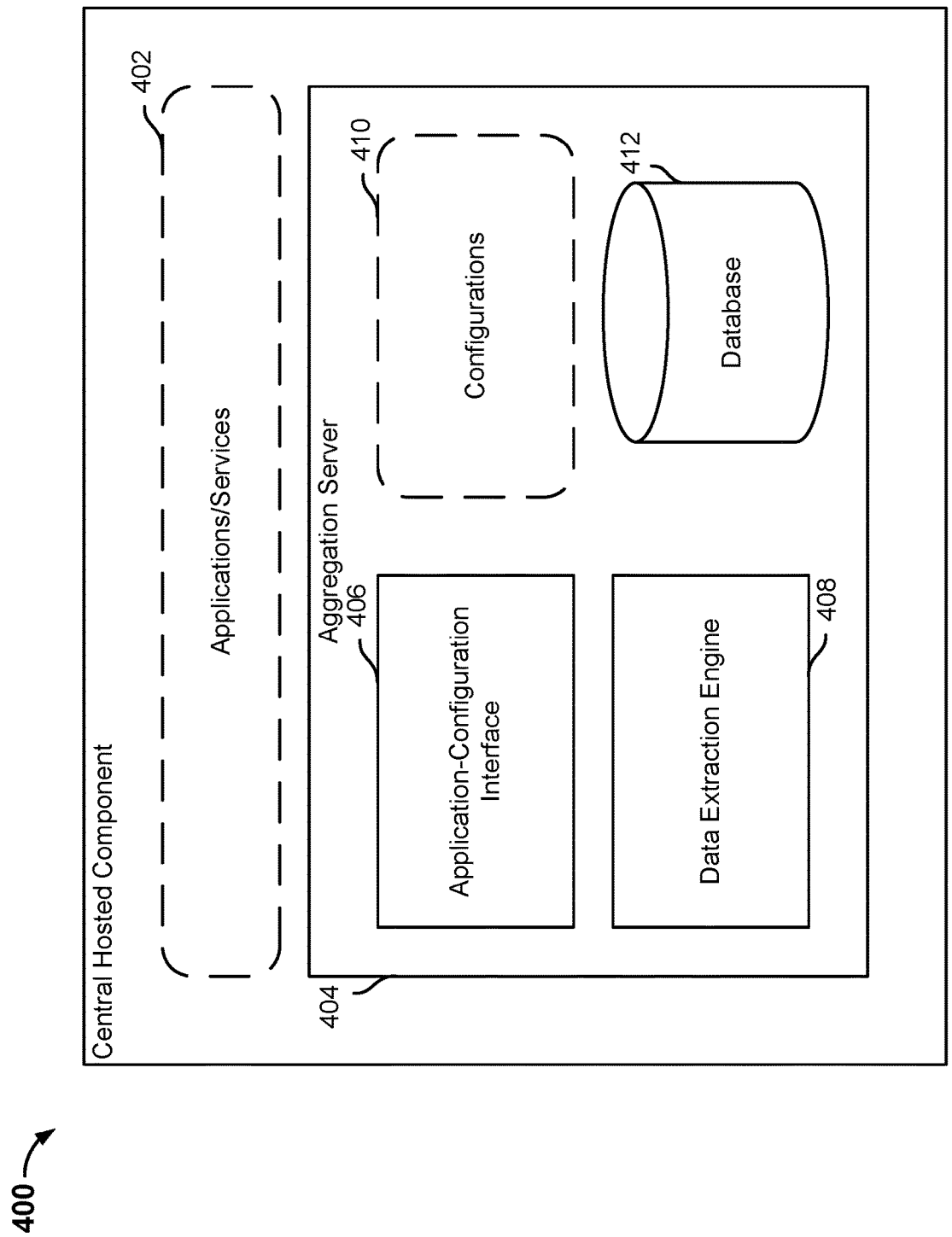
FIG. 4 is a block diagram illustrating an embodiment of a central hosted component.

FIG. 4 is a block diagram illustrating an embodiment of a central hosted component. In some embodiments, central hosted component 400 is an example of central hosted component 202 of FIG. 2. In the example shown, central hosted component 400 includes applications/services 402 and aggregation server 404. Aggregation server 404 further includes application-configuration interface 406, data extraction engine 408, configurations 410, and database 412.

In some embodiments, applications/services 402 include applications/services built on the central hosted component that are subscribed to by various company clients. As described above, the applications/services can include mapping services, weather services, comparison applications (which can be used to compare different sets of data), etc. In some embodiments, the applications/services are pre-configured to use data such as standard insurance data that is known to the central host. However, the applications can also be made aware of custom data (that may be particular to a company) via configuration files. As will be described in more detail below, the configuration files (e.g., stored as part of configurations 410) can be used to specify which applications certain custom data fields should be used for, as well as how those custom data fields should be used in the context of the applications. The application/services will then process the custom data fields according to the user/company/client/customer defined configuration file.

In some embodiments, aggregation server 404 is configured to collect insurance data from a plurality of companies and allow applications/services to reference implementations of collected data for processing. In the example shown, aggregation server 404 includes application-configuration interface 406, data extraction engine 408, configurations 410, and database 412.

In some embodiments, application-configuration interface 406 is configured to allow applications/services on the central hosted component to reference implementations of collected data for processing on the applications/services. For example, for an instance of a service provided by the central hosted component to a particular company, the service can access, via the application configuration interface, the configuration file associated with the company, which defines how custom data (or any other appropriate data defined in the configuration) is to be implemented and integrated into the applications/services provided by the central hosted component. For example, the service can reference the configuration file for the company in order to determine which custom data fields of the company are to be used by/incorporated into the service, and how the custom data fields are to be used in the service. Based on the fields and uses defined in the configuration file, the behavior of the service can be modified to suit the requirements of the particular company (e.g., the fields/options that are available in the UI of the service, the functionality available to the service, etc.). In some embodiments, applications/services directly access the company configuration files to reference data implementations defined in the configuration files for affecting the behavior of the applications/service In some embodiments, data extraction engine 408 is configured to collect insurance data from a plurality of companies. The data can be collected on a per-client basis, in which details of the extraction of data from a particular client are based on the configuration file associated with the client.

In some embodiments, the data extraction engine is configured to receive a request to connect to a client. The request can be received via a client agent such as agent 302 of FIG. 3. As described above, the request can be a request by the client agent for query instructions on what data should be retrieved from the client and how it should be retrieved. In response to the request, the data extraction engine can then determine queries to be sent to and executed by the client. In some embodiments, the instructions are determined using information/parameters defined in the configuration file for a client. For example, the configuration file, as will be described in more detail below, can include the name of a data field (e.g., name of database column storing company data records), the type of the data field, as well as the location of the data field in the client side database. In some embodiments, the location includes a key to the column of the table in a client-side database corresponding to the data field of interest. In some embodiments, when determining query instructions to send, the data extraction engine determines the applications/services subscribed to by the company/customer/client and generates queries for the data to be integrated into the subscribed applications/services.

In some embodiments, the queries to be executed are determined based on characteristics of the database from which data is to be retrieved, which may vary from company to company. This may result because of modification of a client's database configuration, for example, to include additional tables/columns, through an upgrade of the database configuration, etc. Additionally, because the core systems installed at the client are configurable, data models may vary from company to customer. Further variation can arise due to companies having installed different versions of the core client system. Thus, various company systems may share similar, but not identical database structures, requiring different query instructions in order to retrieve data. In some embodiments, determining/constructing the queries to be executed includes assembling queries from a standard template of queries in addition to changes/modifications on a per-company, per-database type, (e.g., Oracle and SQL servers may have different dialects of SQL, thereby requiring different queries), and per-version basis. The data extraction engine can then derive a final set of queries by substituting the changes/modifications into the standard template using regular expression substitutions.

In some embodiments, a template query is used to provide a standard structure for the query, and text substitution is used to generate a final query by substituting the changes/modifications required using regular expression substitutions. In some embodiments, the final query may be programmatically constructed by generating the query text directly with respect to the changes/modifications. In some embodiments, standard elements of the query may be stored and assembled with programmatically generated elements responsive to the changes/modifications. In some embodiments, the information required to assemble the query is derived from the changes and modifications in combination with standard elements, and the information is transmitted to the installed client component which generates the query. In some embodiments, the standard query is represented in the installed client database as a database stored procedure, and the changes/modifications are effected by supplying parameters to the stored procedure to determine the final behavior of the query.

After the queries have been determined, the data extraction engine can be configured to deliver the final set of derived queries/retrieval instructions to the client to be executed. In some embodiments, additional information is transmitted with the queries in order to allow for data extraction to be performed incrementally in order to account for changes to data of interest over time. The additional information can include metadata such as sequence/range indicators, which specify, for each query, a time range (e.g., timestamp of previous retrieval to current time) of data to be extracted. The range indicator can include timestamps representing starting points and endpoints of the range (e.g., a previous retrieval timestamp and the current timestamp), which can be used by the client so that only data values that have been changed or added within the specified time range (e.g., since the previous timestamp at which data was retrieved) are obtained, thereby providing incremental updating of the data field.

In some embodiments, when the configuration specifies a type of data field that the central hosted component was not previously aware of (e.g., data for the field have not been previously extracted) a new column is added to the central database to accommodate values associated with the data field. As the central host has not previously extracted data associated with the field, a "catch up" query can be made for the particular data field with an unlimited range indicator, which indicates to the client that all historical data associated with the data field should be retrieved, for example, to "catch up" to the present time so that the information stored in the central database is up-to-date. For example, suppose that a company decides that they would like to track the number of activities that are completed on processed claims and proceeds to capture the data. The central hosted component is not yet aware of this information and does not have previous knowledge of this new type of custom data being tracked by the company. However, the company would like to have the new custom data integrated into an application/service provided by the central hosted component that the company subscribes to, and modifies their company configuration to include the activities information as a data field of interest to be collected and processed by the central hosted component. Thus, the next time that data extraction is invoked, the central hosted component will request data values associated with the activities data field. However, as data for the custom activities field has not been previously extracted, a catch-up query is performed to capture all historical data values for the field (e.g., by sending an unlimited range indicator) so that all data values recorded since tracking of the activities information can be stored on the central hosted component for processing. Additionally, as the central hosted component has not previously extracted activities information, a new column in the data table for the company is also created in order to store the new activities data values. However, in future data extractions, because activities data has now already been captured by the central hosted component previously, only an incremental extraction is required to capture changes to the data values for the activities field.

In response to receiving the results of the queries, the data extraction engine is further configured to store the results in a database such as database 412. Duplicates can also be removed. In some embodiments, data rows received from the client are labeled with a unique identifier and a sequence indicator (e.g., timestamp, sequence value that is monotonically increasing/decreasing, or any other appropriate sequence/order value). A sequence indicator/value representing the highest order value (e.g., timestamp of most recent retrieval) can be associated with a table of data to indicate the most recent retrieval index. The sequence indicator can be stored to provide a range indicator for the next invocation of determine queries (e.g., time range of data for next set of query instructions to client). In some embodiments, each column of data (corresponding to a particular data field) in the central repository is associated with a sequence value/timestamp to keep track of when the most recent retrieval for each data field occurred. Examples of incremental updating of extracted data are described below.

Figure 5:
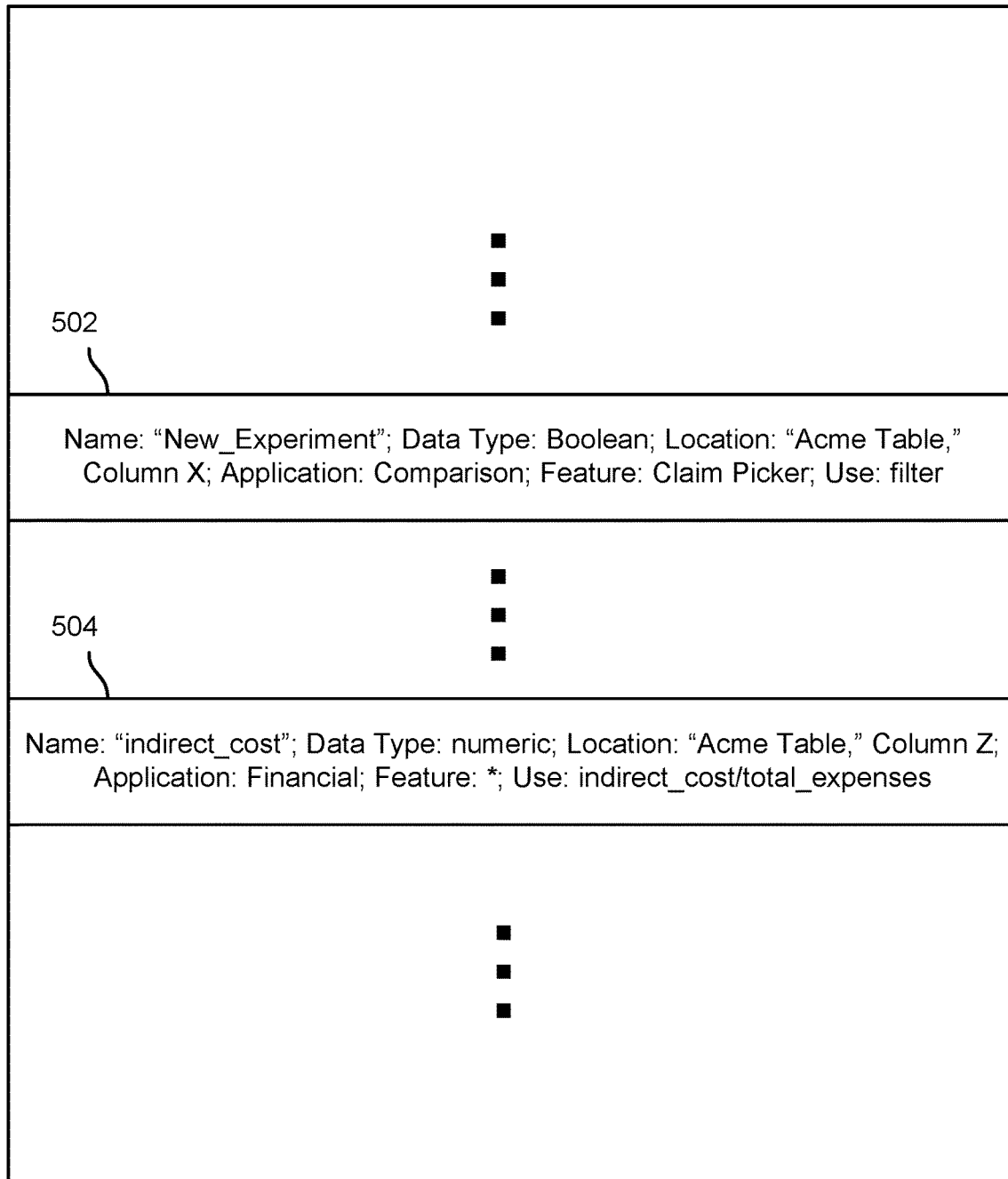
FIG. 5 is a diagram illustrating an embodiment of a configuration file.

In some embodiments, configurations 410 include a set of company configurations. In some embodiments, a configuration defines, for a particular company, the fields of interest to be collected from a client, location information of the fields in the client database, and how the fields are to be processed by the central hosted component. In some embodiments, each company client is associated with a configuration file that includes definitions for all data fields relevant to the particular client, including both standard and custom data fields/elements. In some embodiments, a standard single configuration file is shared by all companies, while each company is further associated with a company-specific extension used for specifying custom company data. In the example shown, configuration files are stored at the central hosted component; however, in other embodiments, each client stores their own respective configuration file. An example of a configuration file is shown in FIG. 5.

Note that although configuration files are referred to here, company configuration data may be stored in many different means. For clarity, the term "configuration file" will be used here to refer more broadly to any persistent means of storing the configuration data described here in a form that allows the relevant information to be retrieved and modified as needed. For example, in some embodiments configuration data is stored in a relational database system, wherein configuration data elements are stored in rows in one or more configuration tables. In some embodiments, configuration data is stored as entries in a key/value store or other computer readable storage medium. The storage of the configuration data can be physically attached to or separate from the installed or central hosted component, for example, in a remote cloud storage service.

In some embodiments, for each data field entry of interest in the configuration file, information specifying the name of the data field, the data type of the field, how to obtain the data for the field, and how the data is to be used by applications/services are defined. Data types for fields can include currency, Boolean, numeric, text, coordinate (e.g., lat/long), country, state, province, zip code (as well as other political/geographical units), or any other appropriate data type.

In some embodiments, the defined uses can specify how the field is to be processed in the context of an application/service on the central host. The uses as well as the applications to which the uses apply can be specified. The uses can be specific to particular applications/services, and a single data field can be used differently for different applications/service (e.g., mapping service may treat a particular data field in a different manner from a comparison application). The data field can also be used in multiple ways by multiple applications/services. An example use for a custom data field could be in defining a new metric. For example, a custom data field of the currency type could be used to define a metric, which is specified in a function configured by a user, for use in a financial application. Thus, a company could define a new financial metric that they are now able to track that other companies cannot. In some embodiments, the use of the field is defined hierarchically, for example, by specifying the use at the levels of application, feature, and use (or action). As one example, the use can be defined by the code "app_name.feature.use," which can be used as a tag for data. An application/service can then use the tag to determine whether the field has been defined for use in the context of the application/service. The application/service can also use the tag to identify any applicable fields in the central host database that can be used. As one example of a tag, a use can be specified as "comparison.picker.filter," which indicates that a data field is defined for use in the comparison application, that the feature in the application (one level lower in hierarchy) with which it is associated with is the "picker" feature (e.g., the feature is to pick claims), and that the data field will be used as a filter in the picking. For example, a Boolean type data field can be used as a filter to select claims of interest in a comparison application.

In some embodiments, use of the field can be specified in a "wildcard" manner, in which the custom field is not tied to a particular specified application/service, but is available to any application/service that is able to process the custom field in the manner in which its use(s) have been defined in the configuration. Additionally, where the field should appear in each of the applications/services with which it is associated with can be specified.

In some embodiments, the set of uses that can be specified for a custom data field depends on the data type of the field. For example, if the data type of a particular field is text, then a user may be restricted from using the data field to calculate a numeric metric (e.g., multiply the text by a numeric value). However, the text field could still be used in a manner that results in a value that is of a different type (e.g., numeric data type), for example, in counting the occurrences of the text in an insurance document.

In some embodiments, the location information defined for a data field includes information associated with how the data field can be obtained from a client database. As described above, the location information can be used during data extraction. In various embodiments, the location information includes a table and column of the client database that the field is associated with, a key to the column (or row) corresponding to the data field, or any other appropriate location information. This location information may be specific to a particular company, as companies can configure and define their own tables and columns, and database structures may vary from company to company.

In some embodiments, a configuration file can be modified by a company (e.g., via a web interface). For example, a company can extend the configuration file to define new entries and data fields that are to be collected and processed by the central hosted component. In response to a new data field being inserted into the configuration file, a new column corresponding to the new data field can be created and added to a table in a central database that is used to store data associated with the company. In this way, after the next invocation of data extraction is performed, values retrieved from the client that are associated with the new field can be stored in the central database table associated with the company.

In some embodiments, the company can also define new classes of custom uses. For example, a company can create custom metrics by specifying new mathematical formulas/equations that use data to define/calculate the new custom metrics. As one example, many companies may track a metric that divides loss expenses into two categories, either a loss expense indicating the amount paid for damages, or adjusted expense, which indicates additional expenses in settling a claim (e.g., how much was spent on inspecting a vehicle, driving an adjustor to the scene of damage, etc.). However, another company may track a third and fourth custom types of expenses, for example, tracking direct costs (e.g., paying employees) and indirect costs (e.g., how much outside consultants were paid). Using the new custom fields, custom metrics (an example of a use) can be defined. For example, a new metric that determines the ratio of the new third and fourth types of expenses can be defined by the company and then used in a financial application/service. Custom metric-uses can also be generated using standard data as well (e.g., defining a new class of metric using existing standard data) or any combination of standard and custom data.

In some embodiments, database 412 is a master central repository used to store data retrieved/collected/aggregated from a plurality of companies. The collected data can be stored in a per-client manner (e.g., partitioned on a per-client basis). For example, each client/customer/company may be associated with a table that includes, for the particular company, all fields and values that have been extracted from the client and stored in the client's table for use in the central repository. Additional information (e.g., metadata) for the client's table may be stored, such as sequence indicators (e.g., timestamps) indicating the last points at which data was extracted from the client and stored in the client's table on the central repository. As the data is stored on a per-client basis, clients can be restricted from viewing the data of other clients.

FIG. 5 is a diagram illustrating an embodiment of a configuration file. In some embodiments, configuration file 500 is an example of a configuration file included in configurations 410 of FIG. 4. In the example shown, each line of the configuration corresponds to the definition of a particular data field/element (that defines how it is to be implemented/integrated into the central hosted component for processing). For example, at 502, the specification of a data field/element with the name "New_Experiment," data type Boolean, Location in "Acme Table," Column X of the client database, for use in the comparison application as a filter in the claim picker feature has been defined. At 504 is an example of a data field/element definition including a custom derived metric-use that is the ratio of the data field "indirect_cost" and total expenses. As described above, each company can be associated with their own respective configuration file specifying definitions for integrating/implementing both standard and custom data, or the companies can share a standard single configuration file but each be associated with company-specific extension used for specifying custom company generated data.

Figure 6:
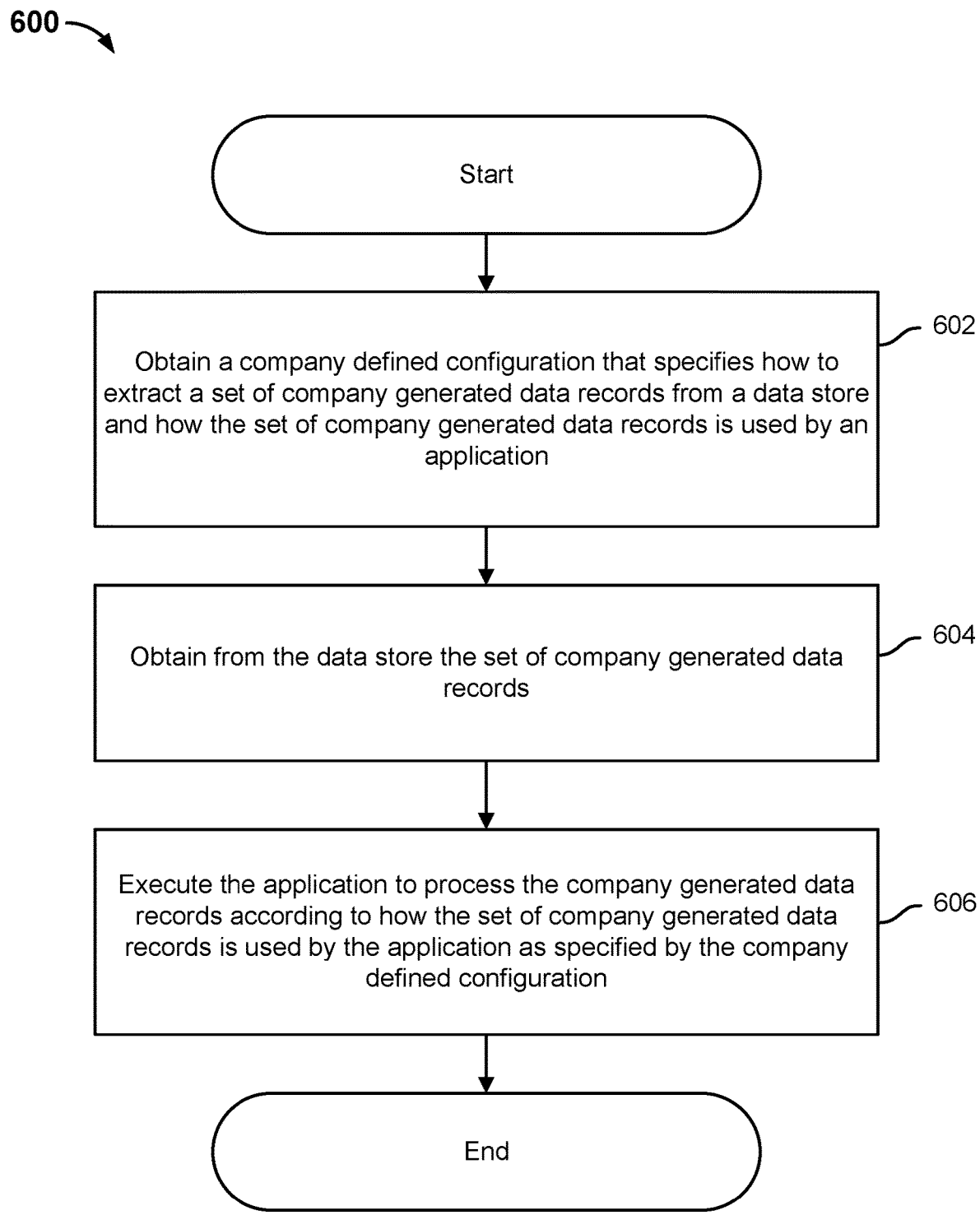
FIG. 6 is a flow diagram illustrating an embodiment of a process for processing insurance data collected from a plurality of companies.

FIG. 6 is a flow diagram illustrating an embodiment of a process for processing insurance data collected from a plurality of companies. In some embodiments, process 600 of FIG. 6 is executed by central hosted component 400 of FIG. 4. The process begins at 602 when a company defined configuration is obtained. An example of a company defined configuration is the configuration file of FIG. 5. In some embodiments, the company defined configuration is obtained in response to a request by a company to execute/run an application. In some embodiments, the company defined configuration is obtained in response to a request by a company for query instructions for data extraction, where the configuration file for the company is accessed to determine the fields that are to be collected.

The company defined configuration specifies how to extract a set of company generated data records from a data store. For example, a line of a configuration file such as that shown in FIG. 5 can include a configuration of user defined information specifying a company data field/element (e.g., column of data/type of data) for which company generated data records (e.g., actual data values) are to be retrieved. The configuration can include information associated with data fields/elements (e.g., data columns) of interest to be retrieved for processing. As described above, the configuration can include information specifying how data should be obtained, such as location information indicating the location in a client core system that the company generated data records (e.g., standard and custom data) are stored. This can include location information for accessing a database column (either common or custom data elements) in a company's database.

In some embodiments, the data store includes common data elements shared by the plurality of companies and company-specific data elements specified by a company. The common data elements include, for example, types of data fields that are common across all companies (e.g., database columns common to all company databases). The company-specific data elements include, for example, data fields/elements created by and specific to particular companies (e.g., database columns specific to a particular company). For example, a company's database of data records can include data columns native to the company application provided by a service provider, data columns that are custom-generated and specific to the company.

The company defined configuration also specifies how the set of company generated data records is used by an application. For example, for a given type of company generated data record to be retrieved, information can be specified in the configuration file that defines, for example, which applications the company generated data records of the given type are to be integrated into, as well as how the data records of the given type will be used in the context of the applications. As shown in the example configuration file of FIG. 5, the configuration file can specify the types of applications that a particular type of data record is to be used in (e.g., indicated via an identifier such as the name of the application), as well as the type of feature that the data records are to be used as (e.g., to be used as a filter in a comparison application).

At 604, the set of company generated data records is obtained from the data store based on the company defined configuration. In some embodiments, company generated data records are obtained for use according to the company defined configuration. For example, as will be described in more detail below, queries can be generated and sent to company databases to retrieve data records stored in data elements such as database columns whose locations in the company's database were specified in the company-defined configuration. In some embodiments, the company generated data records are retrieved via an agent operating on a core system associated with the company. Query instructions to be executed by the company agent can be derived based on the user defined configuration. The query instructions can then be sent to the remote agent to be executed at the remote client. Retrieved values corresponding to the requested data fields to be queried can then be stored for use by the application. In some embodiments, the extracted/obtained company-generated data records are stored by the central host component for further processing (e.g., database 412 of FIG. 4). Extraction/obtaining company generated data records will be described in more detail below in conjunction with FIG. 8.

At 606, the application is executed to process the company generated data records according to how the set of company generated data records is used by the application as specified by the company defined configuration.

In some embodiments, executing the application includes displaying information that is determined based at least in part on the company defined configuration and the company generated data records is presented. The displayed information can include information derived, computed, or calculated from/relative to a custom field/element. For example, a mapping application can use a company-generated data field/element to calculate the color to be shown on a map, the size of a dot to be plotted, etc. Other derived information that can be displayed includes calculated custom metrics derived with respect to custom fields, options available in a UI, such as calculated contents of a dropdown menu to be displayed, calculated available comparisons, etc. In some embodiments, other functionality that can be provided by integrating custom data into an application include presenting/providing an opportunity to select a range of values in order to define a pool of claims (e.g., using a Boolean type data field as a filter to select claims of interest in a comparison application), shading geographical regions on a map based on values of a custom defined field (e.g., generating a heat map of the speed of claims processing in various geographic regions based on tracked custom efficiency data). In some embodiments, the display behavior of an application can be affected based on the configuration associated with a data field without values for the data fields having been retrieved. For example, a drop-down menu can be augmented to display an option for a new custom data field to be displayed, without the custom data field having yet been retrieved. In some embodiments, the application presents an additional feature according to a second user defined configuration. For example, another data field that has been defined for use with the application can also be presented based on a second defined configuration.

Custom Data Scenario: A/B Testing

In this example of integrating custom data with centrally provided applications/services, suppose that a company wishes to run an experiment to determine the impact of settling claims more quickly. In order to do so, an insurance carrier who is a company of a service provider such as Guidewire™ can establish a special unit of employees and instruct them to have a target of closing "simple" insurance claims within an hour. Such a target will cause other decisions to be made when processing a claim, such as decisions to not dispatch a person onsite to assess damage in the interest of time and speed. In this scenario, the carrier can define a custom field that indicates whether a claim is fast or slow, as well as an additional custom field that indicates whether the claim was processed using the "regular" or new "speed targeted" approach. The carrier would like to compare the efficacy of both approaches using a comparison application that is provided by a central hosted component such as Guidewire™ Live. In order to do so, the carrier modifies their specific configuration file, inserting the definitions for the two new data fields, including indicating their type, how they can be located on the client, and how they are to be used by the comparison application. The data values for the two new custom data fields, when retrieved by the central hosted component (e.g., using location information specified in the configuration), can then be used as filters in the comparison application (as defined in the configuration) in order to sort out and separate claims so that the two approaches can be compared. For example, the performance of claims processed under the new "speed targeted" approach in the last six months after beginning the experiment can be identified (e.g., using the data fields as filter criteria) and compared against those claims identified as having been processed regularly (e.g., tagged as "regular") over the same period of time. The carrier can then compare and view data associated with how the two sets of claims varied in terms of the total amount paid out, the amount paid to settle costs, the probability of litigation, company satisfaction, as well as other relevant metrics that can be determined based on the custom data (new metrics based on the new custom data fields can also be defined in the configuration as uses for the data fields). Thus, in this example, the carrier was able to integrate captured custom data into an instance of an application provided by the central hosted component to perform A/B testing. However, another carrier, which does not keep track of such data would not be able to configure their instance of the comparison application to perform the same evaluation.

Incremental Data Extraction Scenario

As described above, data extraction can be performed incrementally to account for changes in the data that may occur at the client. Additionally, if a data field for which values have not previously been extracted and stored on (or otherwise captured by) the central hosted component has been inserted into a configuration as a data field of interest, a catch-up query can be created (along with an unlimited data range sequence identifier) to retrieve all information from the client core system associated with the field up to the current point in time. A new column can also be created and added to the data table associated with the client in the central repository in order to store the new values. Referring to FIGS. 7A-D, an example scenario in which catch-up queries and incremental updates are performed is described.

Figures 7A, 7B:
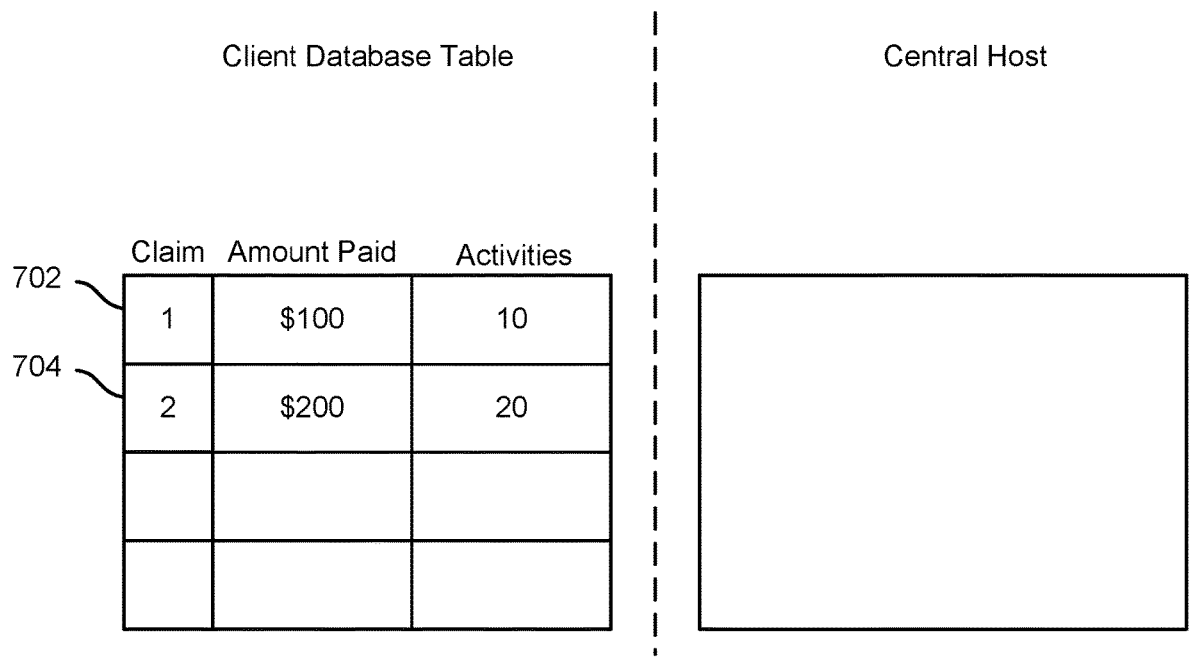
FIG. 7A is a diagram illustrating an initial state of a client table and a central repository table for a company.
FIG. 7B is a diagram illustrating states of a client table and a central repository table.

FIG. 7A is a diagram illustrating an initial state of a client table and a central repository table for a company. In this example, initially, the table of a local client database for a company of a service provider includes two columns, one for amount paid and one for activities. Each row of the table represents values for amount paid and activities with respect to a particular claim. In this example, the first row (702) of the table includes amount paid and activities values for claim 1, while the second row (704) of the table includes values for claim 2. In this initial state, the central host table is empty, as the company has not specified any data fields to be extracted and stored at the central repository.

FIG. 7B is a diagram illustrating states of a client table and a central repository table. Continuing with the example of FIG. 7A, on Monday, the company decides that they would like the central repository to collect "amount paid" data and specifies this by modifying their configuration file to include definitions for integrating the "amount paid" data field/element. However, as the central host table for the company was initially empty, and the central host has not previously extracted "amount paid" data from the company, a new "amount paid" column is created and added to the central host table. A "catch-up" query is then performed such that the new "amount paid" column is "caught up" with the client database table is up to date. In some embodiments, as a new column on the central host was to be filled, when sending the query to the client, the central host also includes an unlimited range indicator, indicating that the central host would like to retrieve "amount paid" from the client database table for all time (e.g., for both claims 1 and 2). In some embodiments, a sequence value, such as a timestamp, indicating when the most recent retrieval occurred (Monday), is stored. In some embodiments, each received row is associated with a timestamp indicating when it was modified, and the highest value (e.g., most recent) timestamp is stored for the column.

FIG. 7C is a diagram illustrating states of a client table and a central repository table. Continuing with the example of FIG. 7B, on Tuesday, in addition to "amount paid" and "activities" data for claims 1 and 2, the company now has data for a third claim that was processed. In this scenario, when the central host requests "amount paid" data from the client, because the central host has previously requested data for the field and a column in the central repository has existing data, instructions for an incremental data request are sent to the remote agent on the client, and only the row corresponding to claim 3 is extracted from the company's database and stored on the central. The determination of which row to retrieve is based on the previously stored timestamp (Monday) indicating when the most recent retrieval occurred. In some embodiments, a new most recent retrieval timestamp is stored (Tuesday).

FIG. 7D is a diagram illustrating states of a client table and a central repository table. Continuing with the example of 7C, on Wednesday, a new "amount paid" and a new "activities" value have been included in the company database, and, as on the previous day, the central host performs an incremental data extraction of only the amount paid for claim 4 based on sequencing information that it retrieved the previous day. However, in the meantime, the company has also modified their configuration so that central host is now also configured to request the "activities" data field when extracting data from the company. However, because the central host has not previously requested "activities" data, a new column for "activities" is added to the central host repository table, and a catch-up query is sent to the client along with an unlimited range query to instruct the client (e.g., via the company's remote agent) to retrieve all historical information (e.g., for claims 1-4) associated with the "activities" data field to be sent to the central host.

Figure 8:
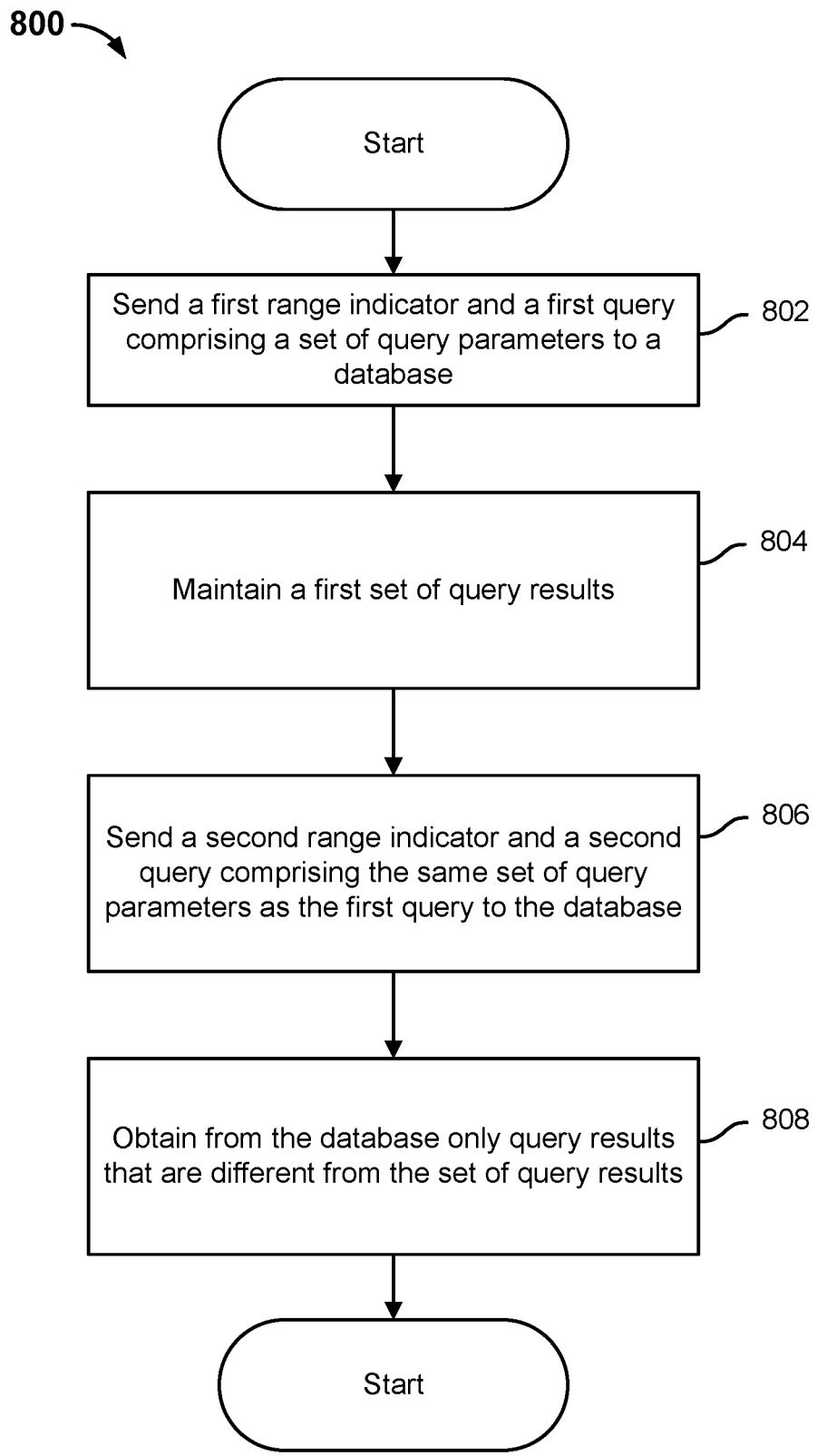
FIG. 8 is a flow diagram illustrating an embodiment of a process for obtaining update data from a database.

FIG. 8 is a flow diagram illustrating an embodiment of a process for obtaining update data from a database. In some embodiments, process 800 of FIG. 8 is executed by data extraction engine 408 of FIG. 4. In some embodiments process 800 of FIG. 8 is used to implement process step 604 of FIG. 6. The process begins at 802 when a first range indicator and a first query comprising a set of query parameters are sent to a database. In some embodiments, the database comprises a remote client database. In some embodiments, the first query is associated with a particular data field of interest and is constructed based on information defined in a configuration file (such as that of FIG. 5) that specifies how the data field/element (e.g., data column) should be retrieved from a remote client database. As described above, the first query can be determined based on a standard template and characteristics of the remote company database (e.g., language, type, version, etc.) that can be substituted into the standard template using regular expression substitution. In some embodiments, as described above, query parameters including information required to assemble a query (e.g., modification parameters for changing a template query) are sent to an installed client component, which generates the query using the information. In some embodiments, it is determined whether values for the data field associated with the first query have been previously obtained from the remote database and stored in a target database. If previous values for the data field have already been obtained, then the first range indicator is a range indicator based on a previous sequence indicator that indicates a range/period of data to be extracted (e.g., time period from most recent retrieval to current time), and a query for incremental updating of existing data is sent to the remote database. In the event that values for the data field have not been previously extracted, the first query is sent as a catch-up query, and the first range indicator sent is an unlimited range query, such that the queries, when executed, cause all historical data associated with the field being queried for to be extracted from the remote database. Additionally, in some embodiments, a new column is generated for the target database in which to store the extracted historical data, such that the new column is now "caught up" to the present time for the previously un-extracted values. In some embodiments, rather than determining whether values for the data field associated with the first query have been previously obtained, it is determined whether a previous query for data associated with the particular data field has been sent. In the event that a query for the data field has not been previously sent, a new column can be created at the central host target database to store extracted historical data to "catch-up." In the event that a previous query for the data field has been determined to have been sent, an incremental update query can be sent.

At 804, a first set of query results is maintained. In some embodiments, the query results are data rows of values received from the remote client database that are stored in an appropriate, corresponding column in a target database (e.g., central hosted component repository). In some embodiments, the received query results are labeled with a unique row identifier and a sequence indicator, such as a timestamp. The data is then stored on the target database, and any duplicates are removed. In some embodiments, the highest sequence indicator received from the remote client database (e.g., data on the remote client database may also time-stamped) is stored.

At 806, a second range indicator and a second query comprising the same set of query parameters as the first query are sent to the database. For example, a new query for updated data can be made using the same parameters as specified in the first query (e.g., location information for how to retrieve the data from the remote client database, characteristics of the remote client database, etc.) As in 802, a determination can be made to determine whether the query to be sent should be a query for incremental updating or a catch-up query.

At 808, only query results that are different from the first set of query results are obtained from the database. For example, only data that has been newly added since the previous data extraction is retrieved to allow for incremental updating of data to account for changes on the remote client database.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
accessing configuration data associated with a particular entity in a plurality of entities, wherein the configuration data includes a specification of:
how to extract a set of entity-generated data records from a remote data store associated with the particular entity, wherein the remote data store associated with the particular entity comprises common data elements shared by the plurality of entities and entity-specific data elements specified by the particular entity; and
how the set of entity-generated data records is to be used by a hosted application;
according to the specification included in the configuration data, transmit, over a network, a set of query parameters to a client component associated with the particular entity, wherein the client component is configured to generate a query for extracting values associated with an entity-specific data field, and wherein generating the query comprises modifying, by the client component, a template query using the set of query parameters;
based at least in part on the generated query, receive a set of values for the entity-specific data field extracted from the remote data store; and
execute the hosted application, including using at least some of the extracted values for the entity-specific data field according to the specification included in the configuration data; and
a memory coupled to the processor and configured to provide the processor with instructions.

2. The system recited in claim 1, wherein the processor is further configured to use the entity-specific data field to define a metric that is used in the hosted application.

3. The system recited in claim 1, wherein executing the hosted application comprises using the entity-specific data field as a filter.

4. The system recited in claim 1, wherein the hosted application comprises a comparison application.

5. The system recited in claim 1, wherein the entity-specific data field is available for use by a plurality of hosted applications.

6. The system recited in claim 1, wherein the processor is further configured to store the extracted values to a data store of a central host component that provides hosted applications to the plurality of entities.

7. The system recited in claim 6, wherein at least one extracted value is associated with a timestamp.

8. The system recited in claim 1, wherein the processor is configured to:
receive a modification to the specification included in the configuration data to request extraction of values for the entity-specific data field; and
generate a column in a data store of a central host component, wherein the extracted values for the entity-specific data field are stored in the generated column.

9. The system recited in claim 1, wherein the query comprises a query for extracting, from the remote data store, all values for the entity-specific data field.

10. The system recited in claim 1, wherein the query comprises an incremental query for incremental extracting of values for the entity-specific data field from the remote data store.

11. A method, comprising:
accessing configuration data associated with a particular entity in a plurality of entities, wherein the configuration data includes a specification of:
how to extract a set of entity-generated data records from a remote data store associated with the particular entity, wherein the remote data store associated with the particular entity comprises common data elements shared by the plurality of entities and entity-specific data elements specified by the particular entity; and
how the set of entity-generated data records is to be used by a hosted application;
according to the specification included in the configuration data, transmitting, over a network, a set of query parameters to a client component associated with the particular entity, wherein the client component is configured to generate a query for extracting values associated with an entity-specific data field, and wherein generating the query comprises modifying, by the client component, a template query using the set of query parameters;

based at least in part on the generated query, receiving a set of values for the entity-specific data field extracted from the remote data store; and executing the hosted application, including using at least some of the extracted values for the entity-specific data field according to the specification included in the configuration data.

12. The method of claim 11, further comprising using the entity-specific data field to define a metric that is used in the hosted application.

13. The method of claim 11, wherein executing the hosted application comprises using the entity-specific data field as a filter.

14. The method of claim 11, wherein the hosted application comprises a comparison application.

15. The method of claim 11, wherein the entity-specific data field is available for use by a plurality of hosted applications.

16. The method of claim 11, further comprising storing the extracted values to a data store of a central host component that provides hosted applications to the plurality of entities.

17. The method of claim 16, wherein at least one extracted value is associated with a timestamp.

18. The method of claim 12, comprising:

receiving a modification to the specification included in the configuration data to request extraction of values for the entity-specific data field; and generating a column in a data store of a central host component, wherein the extracted values for the entity-specific data field are stored in the generated column.

19. The method of claim 11, wherein the query comprises a query for extracting, from the remote data store, all values for the entity-specific data field.

20. The method of claim 11, wherein the query comprises an incremental query for incremental extracting of values for the entity-specific data field from the remote data store.

21. A computer program product embodied in a tangible computer readable storage medium and comprising computer instructions for:

accessing configuration data associated with a particular entity in a plurality of entities, wherein the configuration data includes a specification of:

how to extract a set of entity-generated data records from a remote data store associated with the particular entity, wherein the remote data store associated with the particular entity comprises common data elements shared by the plurality of entities and entity-specific data elements specified by the particular entity; and how the set of entity-generated data records is to be used by a hosted application;

according to the specification included in the configuration data, transmitting, over a network, a set of query parameters to a client component associated with the particular entity, wherein the client component is configured to generate a query for extracting values associated with an entity-specific data field, and wherein generating the query comprises modifying, by the client component, a template query using the set of query parameters;

based at least in part on the generated query, receiving a set of values for the entity-specific data field extracted from the remote data store; and executing the hosted application, including using at least some of the extracted values for the entity-specific data field according to the specification included in the configuration data.

* * * * *

UNITED STATES PATENT AND TRADEMARK OFFICE
CERTIFICATE OF CORRECTION

PATENT NO. : 11,798,096 B2
APPLICATION NO. : 17/320669
DATED : October 24, 2023
INVENTOR(S) : John Lorne Campbell Seybold and Eugene Lee Page 1 of 1

It is certified that error appears in the above-identified patent and that said Letters Patent is hereby corrected as shown below:

In the Specification

In Column 7, Line(s) 61, after "applications/service", insert --.--.

In Column 10, Line(s) 1, delete "determine" and insert --determined--, therefor.

In the Claims

In Column 19, Claim 18, Line(s) 31, delete "12" and insert --11--.

Signed and Sealed this
Twenty-ninth Day of October, 2024

*Katherine Kelly Vidal*

Katherine Kelly Vidal
*Director of the United States Patent and Trademark Office*